United States Patent
Jo et al.

(10) Patent No.: US 10,015,800 B2
(45) Date of Patent: Jul. 3, 2018

(54) BEAMFORMING TRAINING USING POLARIZATION

(71) Applicant: LG ELECTRONICS INC., Seoul (KR)

(72) Inventors: Kyungtae Jo, Seoul (KR); Hangyu Cho, Seoul (KR); Jinmin Kim, Seoul (KR); Eunsung Park, Seoul (KR); Sungjin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 196 days.

(21) Appl. No.: 15/148,977

(22) Filed: May 6, 2016

(65) Prior Publication Data

US 2016/0329938 A1  Nov. 10, 2016

Related U.S. Application Data

(60) Provisional application No. 62/158,538, filed on May 8, 2015.

(51) Int. Cl.
| | | |
|---|---|---|
| *H04W 72/08* | (2009.01) | |
| *H04L 5/00* | (2006.01) | |
| *H04B 7/06* | (2006.01) | |
| *H04B 7/10* | (2017.01) | |

(52) U.S. Cl.
CPC ........ *H04W 72/082* (2013.01); *H04B 7/0619* (2013.01); *H04L 5/0023* (2013.01); *H04B 7/10* (2013.01)

(58) Field of Classification Search
CPC ...... H04W 72/082; H04B 7/10; H04B 7/0619
See application file for complete search history.

(56) References Cited

U.S. PATENT DOCUMENTS

| | | | | |
|---|---|---|---|---|
| 8,165,048 | B2 * | 4/2012 | Imaeda | H04B 7/0617 370/310 |
| 8,625,565 | B2 * | 1/2014 | Cordeiro | H04B 7/0617 370/328 |
| 9,048,894 | B2 * | 6/2015 | Wang | H04B 7/043 |
| 9,264,124 | B2 * | 2/2016 | Wu | H04B 7/10 |
| 9,344,165 | B2 * | 5/2016 | Wang | H04B 7/0695 |
| 9,525,759 | B2 * | 12/2016 | Zhang | H04J 13/102 |
| 9,716,537 | B2 * | 7/2017 | Mammoser | H04B 7/0456 |
| 9,735,994 | B2 * | 8/2017 | Hong | H04L 27/2608 |
| 9,753,118 | B2 * | 9/2017 | Sanderovich | G01S 5/0289 |
| 9,806,783 | B2 * | 10/2017 | Kim | H04B 7/0604 |
| 2017/0033848 | A1 * | 2/2017 | Cordeiro | H04B 7/0452 |

* cited by examiner

*Primary Examiner* — Hassan Kizou
*Assistant Examiner* — Deepa Belur
(74) *Attorney, Agent, or Firm* — Lee, Hong, Degerman, Kang & Waimey

(57) ABSTRACT

A beamforming training using a polarization in a wireless local area network is provided. An initiator receives a response frame from the responder. The response frame includes information about a polarization type selected by the responder. The initiator transmits a sector sweep message to the responder using the selected polarization type through all sectors during a sector sweep.

8 Claims, 8 Drawing Sheets

BEAMFORMING TRAINING USING POLARIZATION

CROSS-REFERENCE TO RELATED APPLICATIONS

Pursuant to 35 U.S.C. § 119(e), this application claims the benefit of U.S. Provisional Application No. 62/158,538, filed on May 8, 2015, the contents of which are all hereby incorporated by reference herein in its entirety.

BACKGROUND OF THE INVENTION

Field of the Invention

The present invention relates to wireless communication, and more particularly, to a method of performing a beamforming training using a polarization and a device using the same.

Related Art

An IEEE 802.11ad standard is a very high-speed wireless communication standard that operates in a band of 60 GHz or above. Even though a signal can reach about 10 meters, the throughput may support 6 Gbps or more. Since the IEEE 802.11ad standard operates in a high frequency band, signal propagation is dominated by ray-like propagation. As a transmit (TX) or receive (RX) antenna beam is arranged toward a strong spatial signal path, signal quality thereof may be improved.

The IEEE 802.11ad standard includes a beamforming training process for antenna beam alignment. To achieve throughput of 20 Gbps or more, a next-generation standard that is being developed on the basis of the IEEE 802.11ad is called as an IEEE 802.11ay. One of the key technologies of the IEEE 802.1 lay is a multiple input multiple output (MIMO) beamforming technology through an array antenna. The IEEE 802.11ad as a conventional technology supports a single stream transmission using one array antenna, and a next-generation technology (e.g. IEEE 802.11ay) thereof supports multi-stream transmission using a plurality of antenna arrays.

To apply the plurality of array antennas, it is required that a plurality of independent beamformings are performed, However this may cause severe interference between a plurality of streams and an increase of time required for the beamformings. A method will be proposed to minimize the interference between the streams and reduce the time required for the beamformings.

SUMMARY OF THE INVENTION

The present invention provides a method for performing a beamforming training using a polarization in a wireless local area network.

The present invention also provides an apparatus for performing a beamforming training using a polarization in a wireless local area network.

In an aspect, a method for a beamforming training using a polarization in a wireless local area network includes transmitting, by an initiator, a plurality of polarization training frames for a plurality of polarization types to a responder, receiving, by the initiator, a response frame from the responder, the response frame including information about a polarization type selected by the responder, and transmitting, by the initiator, a sector sweep message to the responder using the selected polarization type through all sectors during a sector sweep.

The method may further include transmitting, by the initiator, a frame for confirming the selected polarization type to be used during the sector sweep to the responder after receiving the response frame.

In another aspect, an apparatus for performing a beamforming training using a polarization in a wireless local area network includes an array antenna, a transceiver configured to receive and transmit a radio signal through the array antenna, and a processor operatively connected to the transceiver. The processor is configured to control the transceiver to transmit a plurality of polarization training frames for a plurality of polarization types to a responder, control the transceiver to receive a response frame from the responder, the response frame including information about a polarization type selected by the responder, and control the transceiver to transmit a sector sweep message to the responder using the selected polarization type through all sectors during a sector sweep.

DESCRIPTION OF EXEMPLARY EMBODIMENTS

Below, a wireless communication system that operates at a frequency band of 60 GHz or 45 GHz or above will be exemplarily described. A plurality of channels may be provided. For example, one channel may have a bandwidth of 2.16 GHz.

A station (STA) may be referred to as various names such as a wireless device, a mobile station (MS), a network interface device, a wireless interface device, or a user. Unless a function of the station (STA) is separated from that of an access point (AP), the STA may include a non-AP STA or an AP. When a communication between the STA and the AP is described, the STA may be interpreted as the non-AP STA. When a communication between a STA and a STA is described or when a specific AP function is not required, the STA may be the non-AP STA or the AP.

Figure 1:
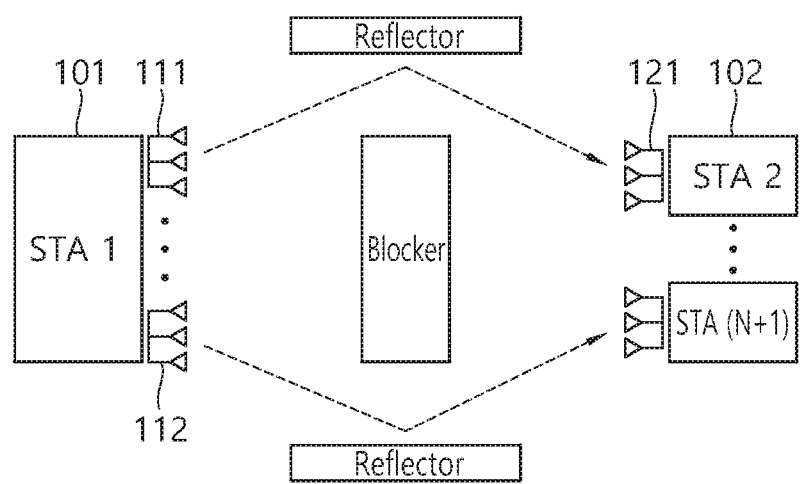
FIG. 1 is a diagram illustrating an example of a multiple input multiple output (MIMO) operation using a plurality of a plurality of array antennas.

FIG. 1 is a diagram illustrating an example of a multiple input multiple output (MIMO) operation using a plurality of array antennas.

A STA1 101 may be an initiator that starts beamforming (BF) training. A STA2 102 that participates in the BF training may be a responder. The responder may include a plurality of STAs. The STA1 101 may include a plurality of array antennas, and the STA2 102 may include at least one array antenna 121. A MIMO operation relates to simultaneous transmission/reception of multiple spatial streams. Each array antenna may be used for transmission/reception of a spatial stream in a sector at a time.

The sector may correspond to a specific antenna beam or pattern. A transmit (TX) sector may be a sector for a TX antenna, and a receive (RX) sector may be a sector for a RX antenna.

Figure 2:
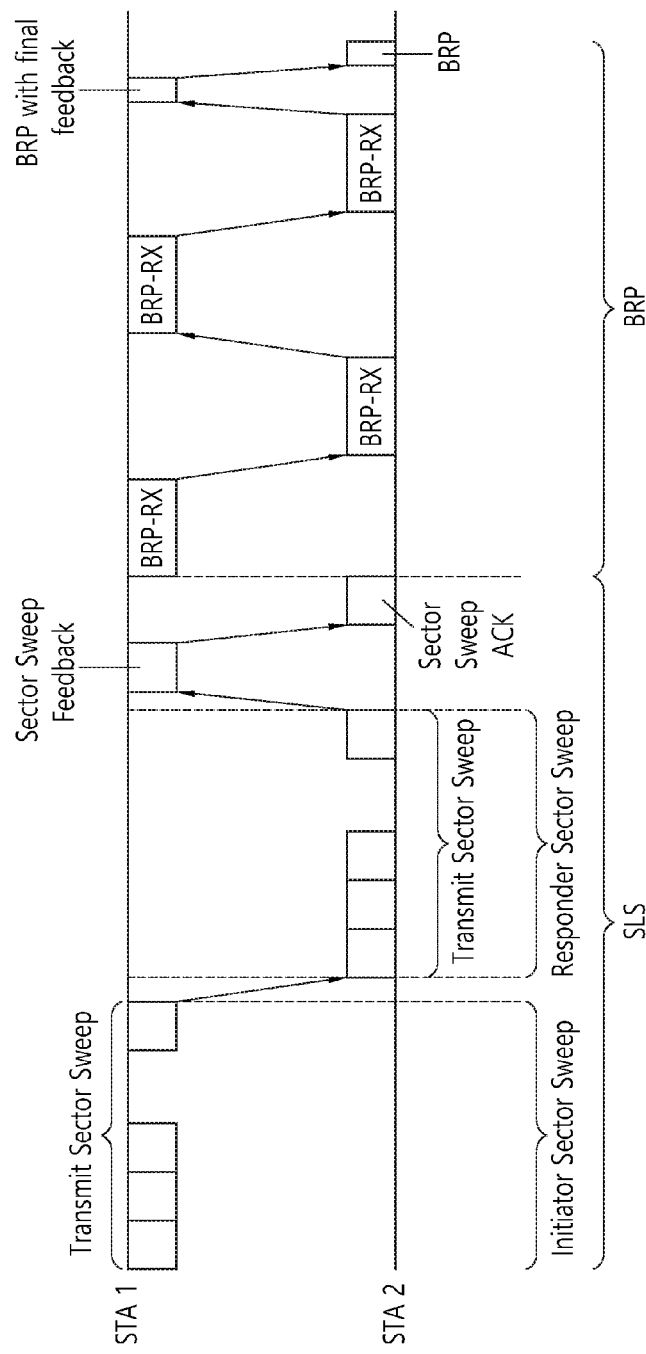
FIG. 2 is a diagram illustrating a beamforming (BF) training process according to the related art.

FIG. 2 is a diagram illustrating a BF training process according to the related art. This may refer to section 9.35 of the IEEE 802.11ad standard.

The BF training may provide transmission of a BF training frame using a sector sweep (SSW) and signaling required for each STA to determine setting an appropriate antenna system. The BF training process may include a sector level sweep (SLS) process and a beam refinement protocol (BRP) process. The SLS process for the sector sweep may be to communicate such that a control physical layer (PHY) is provided between the STAs. The BRP process may provide a refinement of an antenna weight vector between a transmitter and a receiver.

First, the STA1 as the initiator may transmit a sector sweep (SSW) message. The sector sweep message may include a directional multi-gigabit (DMG) beacon frame and/or a sector sweep (SSW) frame. During the sector sweep, the STA1 may send the sector sweep message through all sectors.

The STA2 as the responder may respond to the sector sweep message. A sector sweep message of the responder may be the SSW frame.

The STA1 that receives a sector sweep of the STA2 may send a sector sweep feedback to the STA2. The sector sweep feedback may include information about a sector and an antenna of a frame, which has the best quality, from among frames received from the responder. Furthermore, the sector sweep feedback may include information about a signal to noise ratio (SNR) measured in a frame having the best quality.

The STA2 may send a sector sweep Ack to the STA1. The sector sweep Ack may be transmitted through a sector specified by the lastly received sector sweep feedback.

A sector (a TX sector and/or a RX sector) in which an initiator has the best quality and a sector (a TX sector and/or a RX sector) in which a responder has the best quality may be determined through the SLS process.

When the SLS process is completed, the STA may initiate the BRP process to perform beamforming training of the TX and RX antenna array. The BRP process may include a BRP setup subphase, a multiple sector ID detection (MID) subphase, and a beam combining (BC) subphase.

The conventional BF training merely assumes one-to-one training between two STAs. When there are a great number of responders, it may be required to sequentially perform the BF training with respect to each of the responders. This may cause an excessive time to complete the BF training.

According to proposed embodiments, a plurality of BF trainings may be performed parallelly by generating a plurality of polarization beams using a polarization.

Figure 3:
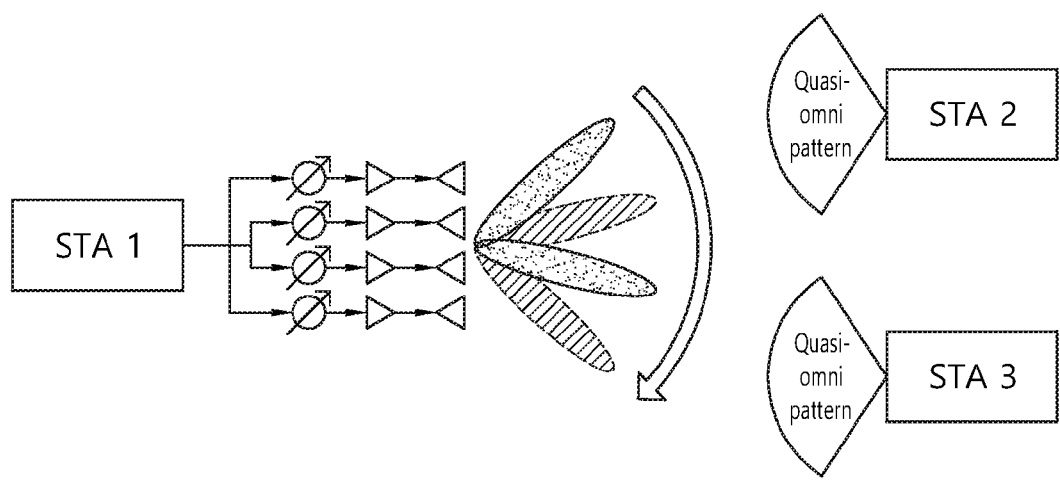
FIG. 3 is a diagram illustrating an example of beamforming (BF) training using a polarization.

FIG. 3 is a diagram illustrating an example of a BF training using a polarization.

For TX and RX antennas, a polarization relates to an orientation of an electric field about an electromagnetic (EM) wave. Even under a high-frequency band such as 60 GHz or above, polarization characteristics of the EM wave may be strongly maintained.

A STA1 may include an antenna (e.g., a multi-beam array (MBA) antenna) having a dual-polarization. The STA1 may perform BF training together with the STA2 using a polarization beam having a first polarization type. At the same time, the STA1 may perform BF training together with a STA3 using a polarization beam having a second polarization type. In addition, when the STA2 and the STA3 have dual-polarization, a single STA may perform simultaneous BF trainings using two different polarization beams. In this case, two different sectors may be transmitted by the single STA.

The polarization type may refer to an orientation of an electric field emitted from an antenna. For example, the polarization type may include a vertical polarization (VP), a horizontal polarization (HP), a left-hand circular polarization (LHCP), a right-hand circular polarization (RHCP), etc.

It is necessary that a polarization type of a beam between an initiator and a responder or between a transmitter and a receiver be matched. To this end, a process will be provided below.

Figure 4:
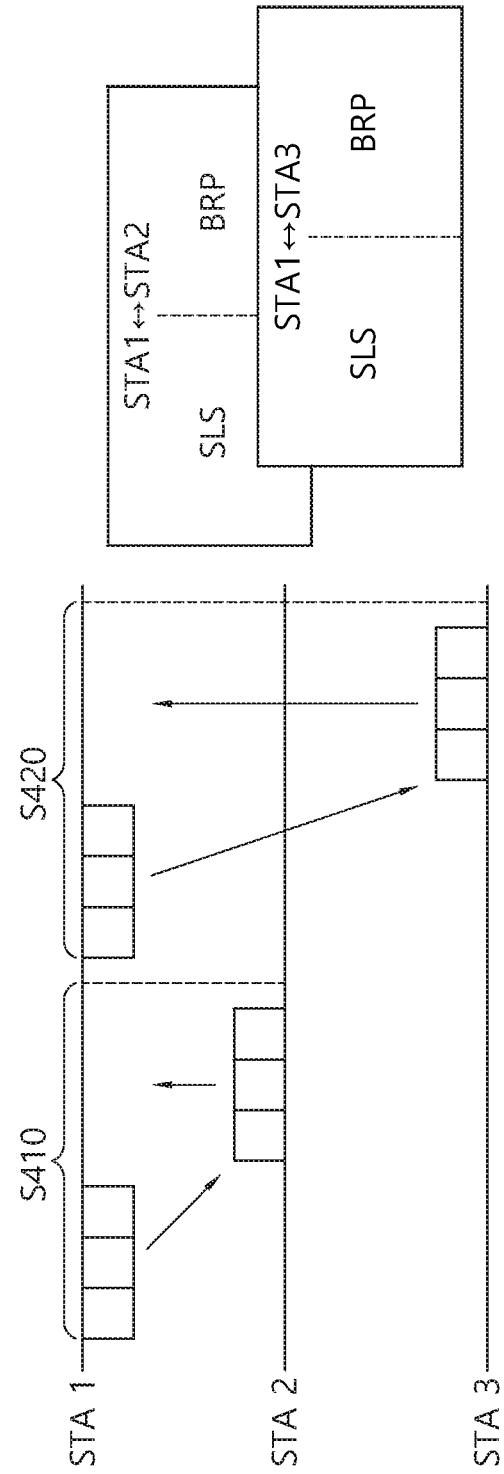
FIG. 4 is a diagram illustrating beamforming (BF) training according to an embodiment of the inventive concept.

FIG. 4 is a diagram illustrating a BF training according to an embodiment of the inventive concept.

A STA1 may be an initiator, and STA2 and STA3 may be referred to as a responder. First, in operation S410, the STA1 performs a polarization level sweep (PLS) for setting up a polarization type with the STA2. During the PLS, the STA1 may transmit a polarization training frame to the STA2, and the STA2 may respond to the transmitted polarization training frame. The polarization training frame may be transmitted to STA1 for all polarization types available. The polarization training frame may include a sector sweep (SSW) frame.

Figure 5:
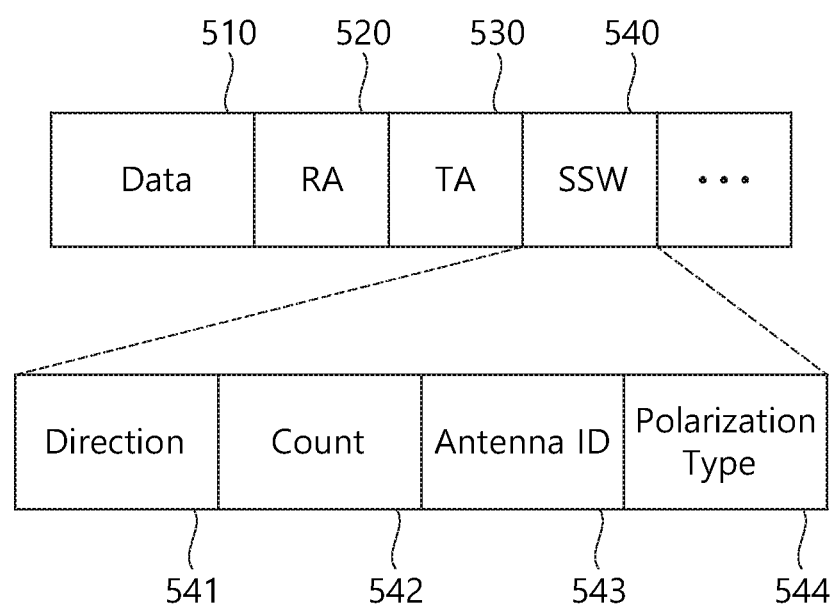
FIG. 5 is a diagram illustrating an example of the SSW frame format transmitted during the polarization level sweep (PLS) of FIG. 4.

FIG. 5 is a diagram illustrating an example of the SSW frame format transmitted during PLS of FIG. 4.

A SSW frame may include a duration field 510, a receiver address (RA) field 520, a transmitter address (TA) field 530, and a SSW field 540.

The duration field 510 is set to the time until the end of the SSW frame transmission that has a value of its count field 542 equal to 0

The RA field 520 indicates an address of the STA that receives a corresponding SSW frame.

The TA field 530 indicates an address of the STA that transmits the corresponding SSW frame.

The SSW field 540 may include a direction field 541, a count field 542, an antenna ID field 543, and a polarization field 544. The direction field 541 may be set to zero to indicate that corresponding frame is transmitted by an initiator, and the direction field 541 may be set to one to indicate that the corresponding frame is transmitted by a responder. The count field 542 indicates the number of times of the remaining SSW frame transmission. The antenna ID field 543 indicates an antenna that the transmitter is currently using for this frame. A polarization type field 544 indicates a polarization type that the transmitter is currently using for this frame.

Referring again to FIG. 4, the STA2 which receives a plurality of SSW frames for a plurality of polarization types may select one or more polarization types best suited. The STA2 sends the selected polarization type(s) to the STA1.

The STA1 may send a frame, which specifies the polarization type to be used in SLS and BRP later, to STA2.

Furthermore, in operation S420, the STA 1 may perform the PLS for setting a polarization type together with the STA 3.

A polarization type selected by the STA2 may be a first polarization type, and a polarization type selected by the STA3 may be a second polarization type. The STA1 may perform SLS and BRP with the STA2 using the polarization beam having the first polarization type. At the same time, the STA1 may perform SLS and BRP with the STA3 using the polarization beam having the second polarization type.

Figure 6:
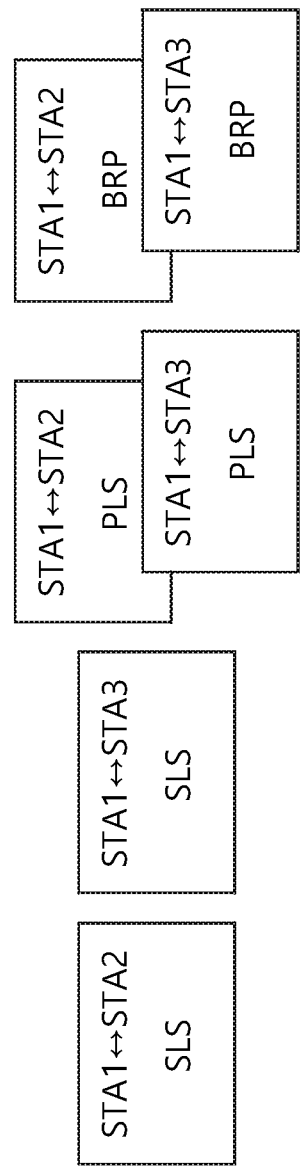
FIG. 6 is a diagram illustrating beamforming (BF) training according to another embodiment of the inventive concept.

FIG. 6 is a diagram illustrating a BF training according to another embodiment of the inventive concept.

The STA1 may perform SLS with the STA2 to setup one or more first sectors. In addition, the STA2 may perform SLS with the STA3 to setup one or more second sectors.

The STA1 may perform PLS with the STA2 through the one or more first sectors. That is, the STA1 may transmit a polarization training frame for all polarization types through the one or more first sectors. The STA2 may select one or more polarization type types best suited therefor and may send information about the selected polarization type and a sector to the STA1. The STA1 may send a frame, which specifies a polarization type and a sector to be used for next BRP, to STA2. The STA2 may send a polarization type, which is received from a sector that has the best quality, from among BF frames received from STA1 to STA1.

The STA1 may perform the PLS simultaneously with STA2 and STA3 or may sequentially perform the PLS with STA2 and STA3.

The STA1 that has completed the PLS may perform the BRP simultaneously with the STA2 and the STA3 using the polarization beam at the same time.

Figure 7:
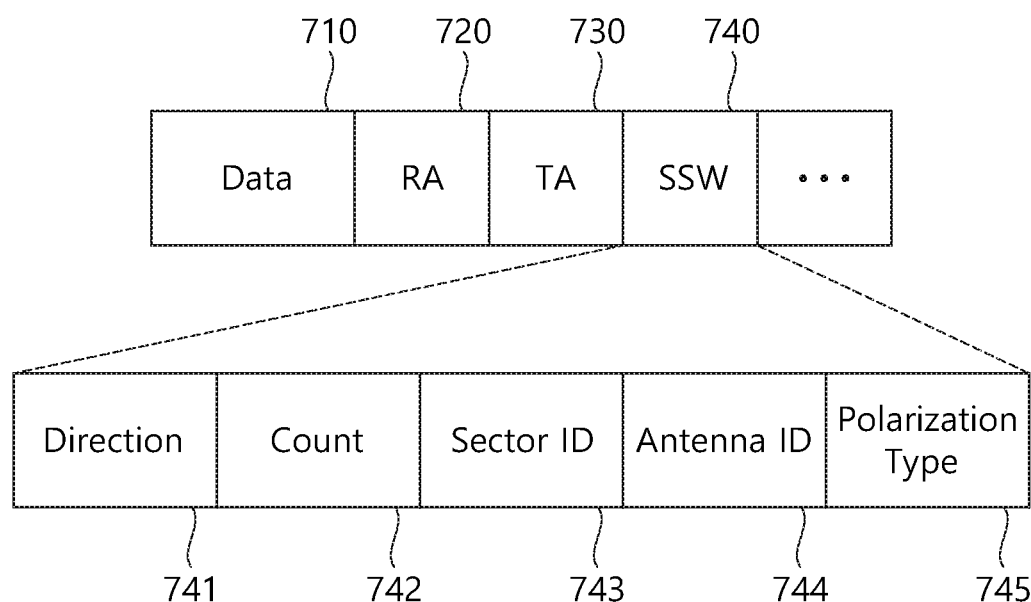
FIG. 7 is a diagram illustrating an example of the SSW frame format transmitted during the polarization level sweep (PLS) of FIG. 6.

FIG. 7 is a diagram illustrating an example of the SSW frame format transmitted during PLS of FIG. 6.

A SSW frame may include a duration field 710, a receiver address (RA) field 720, a transmitter address (TA) field 730, and a sector sweep (SSW) field 740. The SSW field 740 may include a direction field 741, a count field 742, a sector ID field 743, an antenna ID field 744, a polarization type field 744. The sector ID field 543 indicates a sector through which the corresponding frame is transmitted. A polarization type field 544 indicates a polarization type that the transmitter is currently using for this frame.

Figure 8:
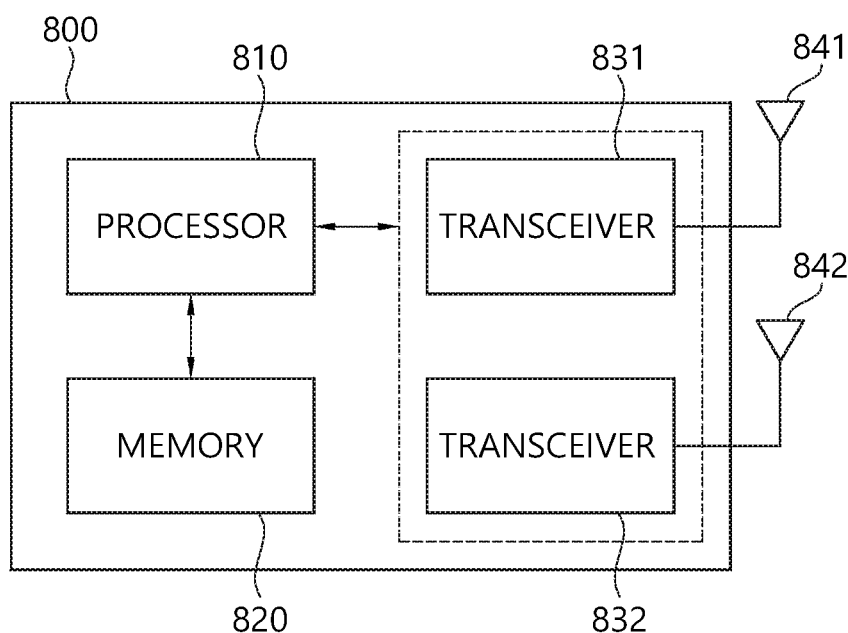
FIG. 8 is a block diagram illustrating a station (STA) which implements an embodiment of the inventive concept.

FIG. 8 is a block diagram illustrating a STA which implements an embodiment of the present invention.

A STA 900 may include a processor 910, a memory 920, a plurality of transceivers 931 and 932, and a plurality of array antennas 941 and 942. The transceivers 931 and 932 may receive a radio signal through the array antennas 941 and 942, may convert the received wireless signal into a baseband signal to send the converted baseband signal to a processor 910. The transceivers 931 and 932 may receive the baseband signal from the processor 910 to convert the received baseband signal into a wireless signal and may transfer the converted wireless signal through the array antennas 941 and 942. The processor 910 may perform the operation of the STA according to the above-described embodiment. The memory 920 may store instructions required for the operation of the STA therein.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for a beamforming training using a polarization in a wireless local area network, the method comprising:
    transmitting, by an initiator, a plurality of polarization training frames to a responder during a polarization level sweep interval, each of the plurality of polarization training frames including a direction field indicating whether a corresponding polarization training frame is transmitted by the initiator or by the responder, a count field indicating a number of remaining polarization training frames after transmitting the corresponding polarization training frame, an antenna identifier field indicating an antenna that transmits the corresponding polarization training frame, and a polarization type field indicating a first polarization type used for the corresponding polarization training frame;
    receiving, by the initiator, a response frame from the responder, the response frame including information indicating a second polarization type selected by the responder based on the plurality of polarization training frames; and
    transmitting, by the initiator, a plurality of sector sweep messages based on the second polarization type to the responder through a plurality of sectors during a sector level sweep interval,
    wherein the plurality of sectors corresponds to predetermined transmit antenna patterns of the initiating device, and
    wherein the first polarization type corresponds to vertical polarization, horizontal polarization, left-hand circular polarization, or right-hand circular polarization.

2. The method of claim 1, further comprising,
    transmitting, by the initiator, a confirmation frame for confirming the second polarization type to be used during the sector level sweep interval to the responder after receiving the response frame.

3. The method of claim 1, wherein the plurality of polarization training frames correspond to a plurality of sector sweep frames.

4. The method of claim 1, wherein the wireless local area network operates at the frequency band of 45 GHz or above.

5. An apparatus for performing a beamforming training using a polarization in a wireless local area network, the apparatus comprising:
    an array antenna configured to transmit and receive signals;
    a transceiver configured to receive and transmit a radio signal through the array antenna; and
    a processor operatively connected to the transceiver and configured to control the transceiver to:
    transmit a plurality of polarization training frames to a responder during a polarization level sweep interval, each of the plurality of polarization training frames including a direction field indicating whether a corresponding polarization training frame is transmitted by the initiator or by the responder, a count field indicating a number of remaining polarization training frames after transmitting the corresponding polarization training frame, an antenna identifier field indicating an antenna that transmits the corresponding polarization training frame, and a polarization type field indicating a first polarization type used for the corresponding polarization training frame;

receive a response frame from the responder, the response frame including information indicating a second polarization type selected by the responder based on the plurality of polarization training frames; and transmit a plurality of sector sweep messages based on the second polarization type to the responder through a plurality of sectors during a sector level sweep interval, wherein the plurality of sectors corresponds to predetermined transmit antenna patterns of the initiating device, and wherein the first polarization type corresponds to vertical polarization, horizontal polarization, left-hand circular polarization, or right-hand circular polarization.

6. The apparatus of claim 5, wherein the processor is configured to control the transceiver transmit a confirmation frame for confirming the second polarization type to be used during the sector level sweep interval to the responder after receiving the response frame.

7. The apparatus of claim 5, wherein the plurality of polarization training frames correspond to a plurality of sector sweep (SSW) frames.

8. The apparatus of claim 5, wherein the wireless local area network operates at the frequency band of 45 GHz or above.

* * * * *